(12) United States Patent
Ju et al.

(10) Patent No.: US 7,420,567 B2
(45) Date of Patent: Sep. 2, 2008

(54) MEMORY ACCESS METHOD FOR VIDEO DECODING

(75) Inventors: Chi-Cheng Ju, Taipei (TW); Jeffrey Ju, Hsinchu (TW)

(73) Assignee: Media Tek Inc., Hsin Chu (TW)

( * ) Notice: Subject to any disclaimer, the term of this patent is extended or adjusted under 35 U.S.C. 154(b) by 0 days.

(21) Appl. No.: 10/773,266

(22) Filed: Feb. 9, 2004

(65) Prior Publication Data

US 2004/0155883 A1  Aug. 12, 2004

Related U.S. Application Data

(63) Continuation-in-part of application No. 10/256,020, filed on Sep. 27, 2002, now abandoned.

(51) Int. Cl.
*G06F 12/02* (2006.01)
*G06F 13/00* (2006.01)
*G09G 5/399* (2006.01)

(52) U.S. Cl. .................. 345/544; 345/540; 345/536
(58) Field of Classification Search ............... 345/544, 345/540, 560, 536, 530
See application file for complete search history.

(56) References Cited

U.S. PATENT DOCUMENTS 5,510,857 A   4/1996   Kopet et al.
5,581,310 A * 12/1996  Vinekar et al. ............. 348/718
5,872,577 A *  2/1999  Perrin ........................ 345/535
6,088,047 A    7/2000  Bose et al.
6,104,416 A *  8/2000  McGuinness ............... 345/544

OTHER PUBLICATIONS

Breitfelder, Kim; Messina, Don. The Authoritative Dictionary of IEEE Standards Terms. 2000. IEEE Press. Seventh Edition. p. 789.*

* cited by examiner

*Primary Examiner*—Kee M. Tung
*Assistant Examiner*—Joni Hsu
(74) *Attorney, Agent, or Firm*—Muncy, Geissler, Olds & Lowe, PLLC (57) ABSTRACT

A method of storing an array of digital data into a memory. The memory includes a plurality of memory pages, and each memory page has a first memory section and a second memory section. The method includes a first step of dividing the array of digital data into a plurality of block units, while each of the block units has a plurality of odd rows and a plurality of even rows, and each of the odd rows and the even rows has at least one byte. The method further includes a second step of storing subsequent odd rows of at least one of the block units into consecutive storage locations in the first memory section, and storing subsequent even rows of at least one of the block units into consecutive storage locations in the second memory section. In this way, the memory bandwidth can be used more efficiently.

10 Claims, 8 Drawing Sheets

といった具合に,

MEMORY ACCESS METHOD FOR VIDEO DECODING

This application is a Continuation-In-Part of Application No. 10/256,020 filed on Sep. 27, 2002 now abandoned, the entire contents of which are hereby incorporated by reference and for which priority is claimed under 35 U.S.C. § 120.

BACKGROUND OF THE INVENTION

1. Field of the Invention

The invention relates to a memory access method, and in particular to a memory access method in which a picture is divided into several macroblocks and stored in the memory block by block, and the top and bottom field of each macroblock are separately stored in different consecutive addressing areas of pages. According to this method, the DRAM burst mode can be utilized for both frame and field access to substantially increase effective DRAM bandwidth. In this way, the drawbacks in both the frame-organized method and field-organized method can be avoided.

2. Description of the Related Art

In current video decoding systems, such as MPEG-I, MPEG-II, H.261, and the like, the inter-frame compression technology is often used to reduce the data redundancies between pictures so as to obtain a better data compression result. The systems all involve algorithms based on a common core of the compression technology, such as predictive and/or inter-polative inter-picture encoding. The motion compensation is block-based, and each prediction block has associated motion vectors. The motion compensation operation involves reading the prediction block from a reference picture according to the motion vectors. A reference picture is used for forward and backward prediction. The reference picture can be either a reference-frame-picture, or a reference-field-picture having one reference-top-field-picture and one reference-bottom-field-picture. A reference-frame-picture is encoded as a frame picture, and contains lines of spatial information of a video signal. These lines of spatial information contain samples starting from the uppermost of the picture continuing through successive lines to the downmost of the picture. A reference-field-picture is encoded as a field picture, and is the assembly of alternate lines of a frame. Each line of a reference-top-field-picture is spatially located immediately above the corresponding line of the reference-bottom-field-picture. The reference pictures are quite large and typically stored in dynamic random access memories (DRAMs). The DRAM has several memory banks, and each bank includes many memory pages. However, there is a problem of cross-page penalty in the DRAM. The DRAM can be addressed by the column address and the row address, and a different row address is addressed to a different page. Before reading the data in different pages, it is necessary to activate and pre-charge the to-be-read page. Consequently, reading the data from different pages may slow down the speed for the video decoder to read the reference picture. In order to mitigate the cross-page penalty, it is desired to store each prediction block into fewer pages during data accessing, and then to access data in a page-by-page manner.

The increasing demand for more memory bandwidth requires the use of sophisticated memory devices like DDR SDRAM or RDRAM (Rambus DRAM). To obtain high performance, these devices have two main features: the burst-access mode and the multiple-bank architecture. The burst-access mode enables access to a number of consecutive addressing data words by simply giving a burst read command or a burst write command. The burst read command or burst write command includes a burst-starting-address indicating the starting address of the data to be retrieved, and a burst-access-length indicating the size of the data to be retrieved. The multiple-bank architecture has the feature that each bank can be accessed alternately. A burst access operation majorly includes three steps. Firstly, issue a row-activation command so as to copy the row data of a designated bank into the sense amplifier. Secondly, issue a burst access command to fetch data of the size indicated in the burst-access-length from the sense amplifier and then send the fetched data to the data bus. Thirdly, access data stored in other columns but in the same row by changing only the column address without issuing any additional row-activation command. Since these steps are pipelined with an external clock, SDRAM or RDRAM can operate at higher clock frequency, and commands issued to different banks can be overlapped. For example, a row-activation command of one bank can be overlapped with burst access operations of another bank. So the number of cycles for the row-activiation can be reduced. Therefore, if we can access the reference picture by burst access mode, the effective DRAM bandwidth can be greatly boosted up.

In a typical video decoding system, a reference picture has two fields, i.e., top field and bottom field. The top field includes all the odd number data rows in the reference picture, while the bottom field includes all the even number data rows in the reference picture. The top field and the bottom field can be samples retrieved at the same or different time instant in the time axis. To achieve the best compression ratio and reconstructed image quality, frame-based prediction and field-based prediction mode are used. The frame-based prediction is a prediction mode using both the top field and bottom field of the reference picture, and the field-based prediction is a prediction mode using only one field of the reference picture. In the case that the top and bottom fields of the frame are sampled at a same time instant, frame-based prediction is used. In the case that the top and bottom fields of the frame are sampled at a different time instant, field-based prediction is used. In another aspect, since the reference picture can be divided into many macroblocks, each macroblock includes a portion of the top field and a portion of the bottom field. The specific portion of the top field belonging to a macroblock will be described as "the corresponding top field of the macroblock" in the following description. Similarly, the specific portion of the bottom field belonging to a macroblock will be described as "the corresponding bottom field of the macroblock."

To perform the motion compensation operation in a frame-based prediction, the frame access method that concurrently accesses both the top field and bottom field is used. On the other hand, to perform the motion compensation in a field-based prediction, the field access method that accesses either the top field or the bottom field is used.

Figure 1:
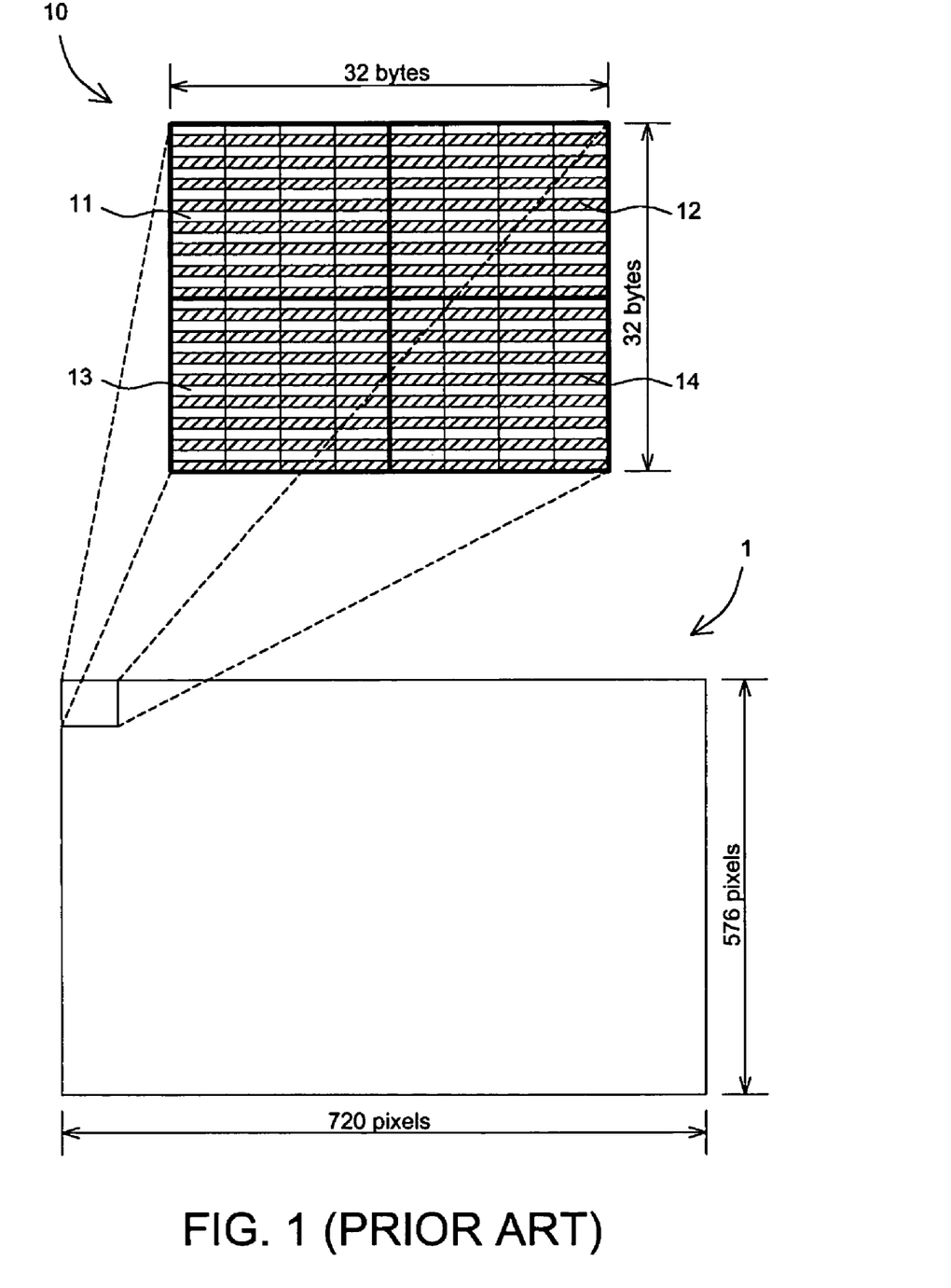
FIG. 1 is a diagram showing a conventional arrangement wherein the reference picture is stored in the memory in the unit of macroblocks.

FIG. 1 is a diagram showing a conventional arrangement wherein the reference picture is stored in the memory by a frame-organized storage method. In the frame-organized storage method, a reference-frame-picture is directly stored in a frame buffer 1. On the other hand, the reference-top-field-picture and the reference-bottom-field-picture are interlaced and combined as a frame structure, and then stored into a frame buffer 1. FIG. 1 illustrates a page 10 stored in a frame buffer 1. Please note that in this drawing, each address is directed to double words (4 bytes) of data. The picture has 720*576 pixels, and contains 720*576 bytes of data if each pixel is represented by one byte of data, so the frame buffer 1 contains 720*576 bytes of data. Each page has 32*32=1,024 bytes of data, and includes four 16*16 bytes macroblocks 11, 12, 13 and 14. As described above, each macroblock includes a portion of the top and bottom fields, wherein the shadowed areas denote the bottom field in this drawing. There are drawbacks for this conventional frame-organized storage method. For example, for accessing the top or bottom field in a field-based prediction, the above-mentioned DRAM burst-access mode can't be used since the accessed addresses are not consecutively located. For example, if we want to read the top field of the macroblock 11 in FIG. 1, the read addresses are not consecutively located, we can't use DRAM burst access mode to read these data. Hence, the effective DRAM bandwidth will be substantially decreased.

Figure 2:
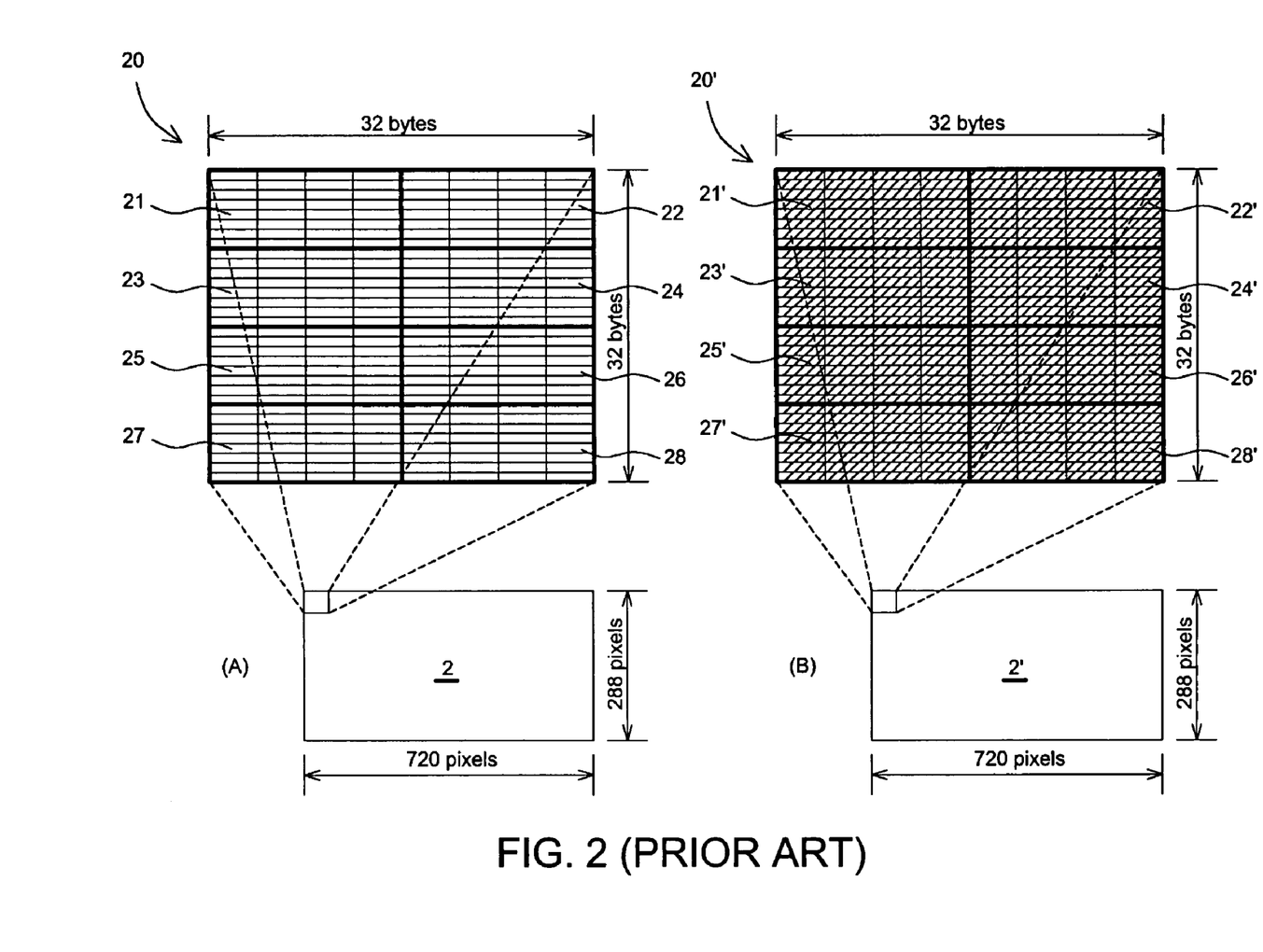
FIG. 2 is a diagram showing another conventional arrangement wherein the reference picture is stored in the memory in the unit of macroblocks.

FIG. 2 is a diagram showing a conventional arrangement wherein the reference picture is stored in the memory by a field-organized storage method. In the field-organized storage method, the reference-top-field-picture and the reference-bottom-field-picture are respectively stored in different field buffers. On the other hand, the reference-frame-picture is composed of a reference-top-field-picture and a reference-bottom-field-picture, which are stored in different field buffers. Also, assuming the picture has 720*576 pixels, and contains 720*576 bytes of data if each pixel is represented by one byte of data, each of the field buffers 2 and 2' has 720*288 bytes of data. The field buffers 2 and 2' are different portions of a memory. The page 20 has 32*32 bytes of data, and stores eight portions of the top field, indicated as 21 to 28 in FIG. 2(A); the page 20' has also 32*32 bytes of data, and stores eight portions of the bottom field, indicated as 21' to 28' in FIG. 2(B). In the field-organized method, since the top and bottom fields are stored in different field buffers 2, 2', the corresponding top and bottom fields of each macroblock will be stored in different pages. Although the field-organized method can avoid the drawbacks of the frame-organized method, another disadvantage occurs in the frame access of a frame-based prediction. When a system perform the frame access in a frame-based prediction so as to fetch both the top and bottom field data, cross page penalties will occur since the top and bottom fields of each macroblock are stored in different pages. Hence, the effective DRAM bandwidth of field-organized method will be lowered due to the inevitable cross page penalties of frame access.

SUMMARY OF THE INVENTION

In view of the above-mentioned problems, it is therefore an object of the invention to provide a memory access method for video decoding in which a reference picture is stored in a memory in the unit of macroblocks, and the corresponding top and bottom field of each macroblock are separately stored in different consecutive addressing areas of pages. According to this method, a system can fully utilize DRAM burst mode for both frame and field access to substantially increase effective DRAM bandwidth. Furthermore, we can avoid inefficient DRAM access in the frame-organized method, and avoid undesirable cross-page penalty in frame access in the field-organized method.

To achieve the above-mentioned objects, a new method of storing pixel data of a reference picture and retrieving a prediction block of the reference picture from a memory is provided. According to the preferred embodiments, the memory is divided into several pages. The reference picture consists of a top field and a bottom field, and is divided into several macroblocks. Each macroblock has a corresponding portion of the top field and the bottom field of the reference picture. The method includes the steps of: dividing each page into a top-section having one or more consecutive addressing area and a bottom-section having one or more consecutive addressing areas; storing the corresponding top field of the macroblocks into the top-sections, and the corresponding bottom field of the macroblocks into the bottom-sections; and then retrieving the pixel data of the prediction block stored in the memory in a page-by-page manner.

DETAILED DESCRIPTION OF THE INVENTION

The memory access method for video decoding of the preferred embodiments will be described with reference to the accompanying drawings. Although the MPEG format is described as an example of the memory access method of the invention, the scope of the invention is not limited thereto.

Figure 3:
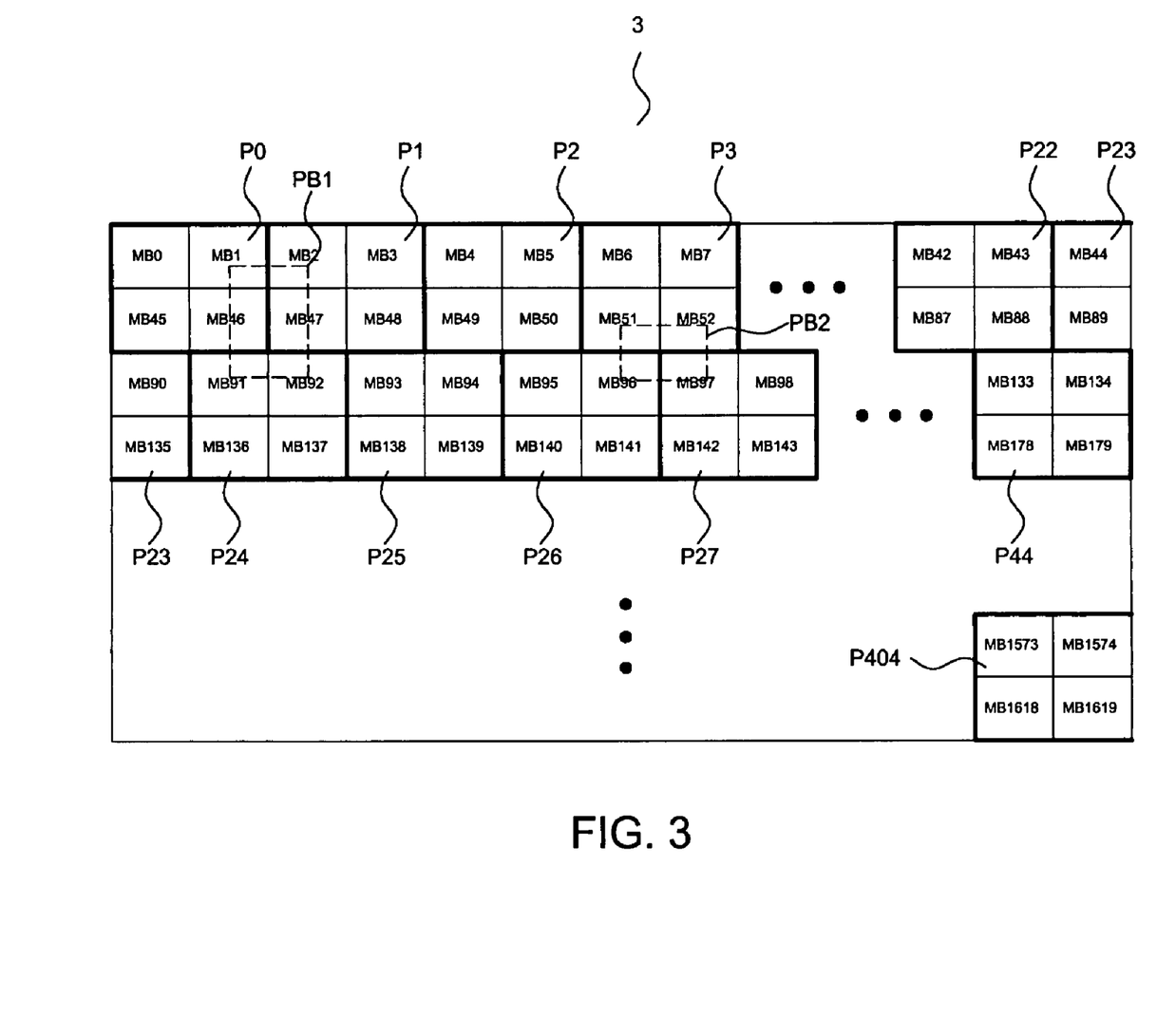
FIG. 3 is a schematic illustration showing the reference picture divided in the unit of macroblocks according to the first embodiment of the present invention.

FIG. 3 illustrates the pixel data of a reference picture of 720*576 pixels divided into many macroblocks. Assuming each pixel is represented by one byte of data, and then the reference picture 3 contains 720*576 bytes of data. In this embodiment the size of each macroblock is 16*16 pixels according to the definition of MPEG, so the data quantity of each macroblock is 256 bytes, and each macroblock includes a corresponding portion of the top field and the bottom field of the reference picture. Consequently, the reference picture is divided into 45*36 macroblocks, which are respectively denoted as MB0 to MB1619 in this drawing. Then, the number of macroblocks stored in each page is calculated according to the size of the page. Assuming the size of each page is 1,024 bytes in this embodiment, four macroblocks can be stored in one page since the size of each macroblock is 256 bytes.

After the number of macroblocks stored in each page of the memory is calculated and obtained, we store neighboring macroblocks in the reference picture into the page. In this embodiment, four macroblocks can be stored in one page, so every four (2*2) macroblocks may be regarded as one set of macroblocks for being sequentially stored into each corresponding page. The overall 1,620 macroblocks can be grouped as 405 sets of macroblocks, and can be stored into 405 pages of the memory.

Figure 4:
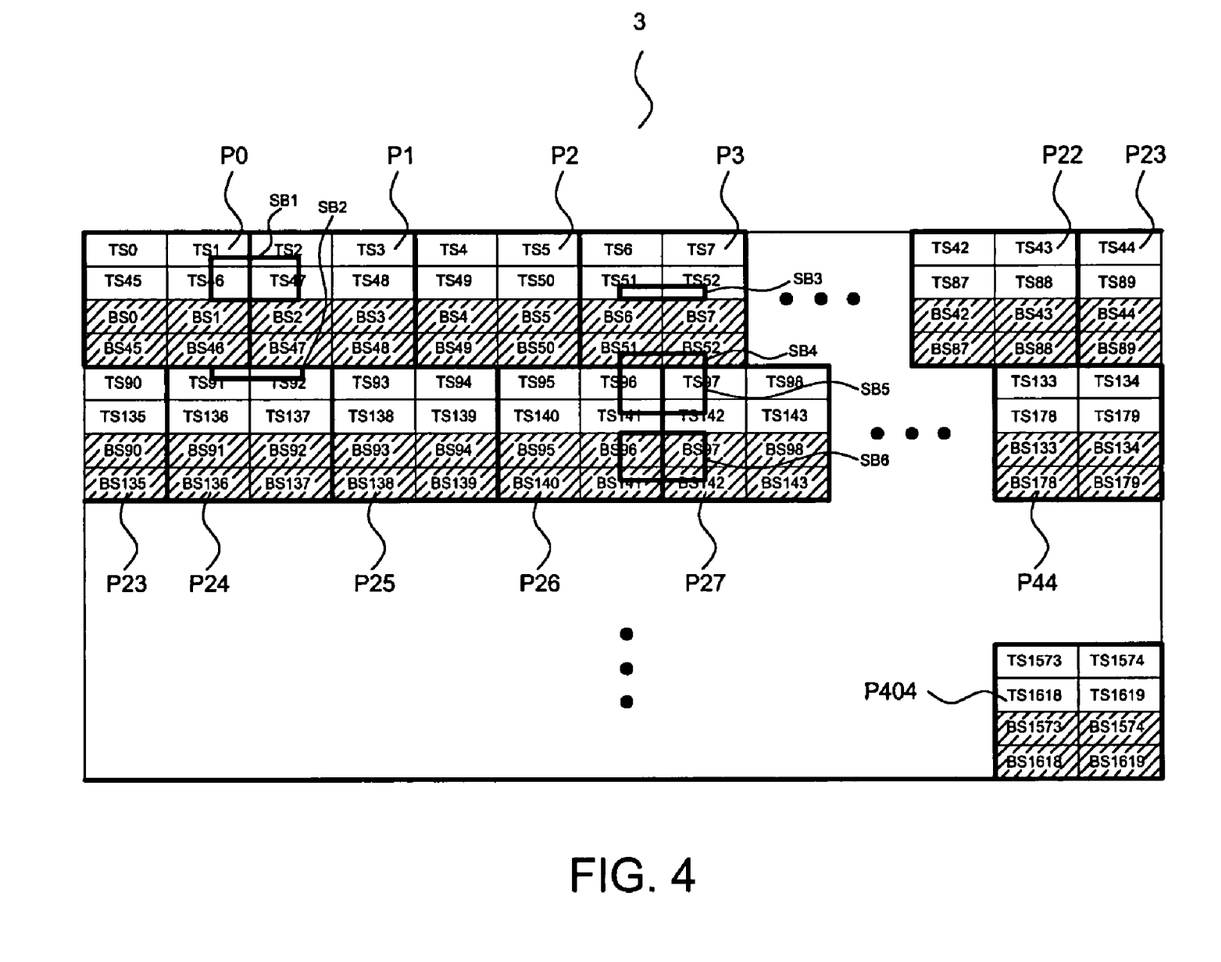
FIG. 4 is a diagram showing an arrangement wherein the reference picture is stored in the memory in the unit of macroblocks according to the first embodiment of the invention.

FIG. 4 illustrates the 405 sets of macroblocks are stored into the 405 pages of a buffer 4 according to one embodiment of the present invention. The buffer 4 is a portion of a memory, such as DDR SDRAM or RDRAM. Each page of the memory is divided into a top-section and a bottom-section. The top-section includes several consecutive addressing areas, and so is the bottom-section. The corresponding top field of the macroblocks belonging to this page is stored into the consecutive addressing areas of the top-section, and the corresponding bottom field of the macroblocks belonging to this page is stored into the consecutive addressing areas of the bottom-section.

As shown in FIG. 4, the corresponding top and bottom field of the four macroblocks of each page are separated, and respectively stored in the top-sections TS0 to TS404 and the bottom-sections BS0 to BS404. The shadowed areas shown in FIG. 4 denote the bottom-sections for the bottom fields.

Figure 5A:
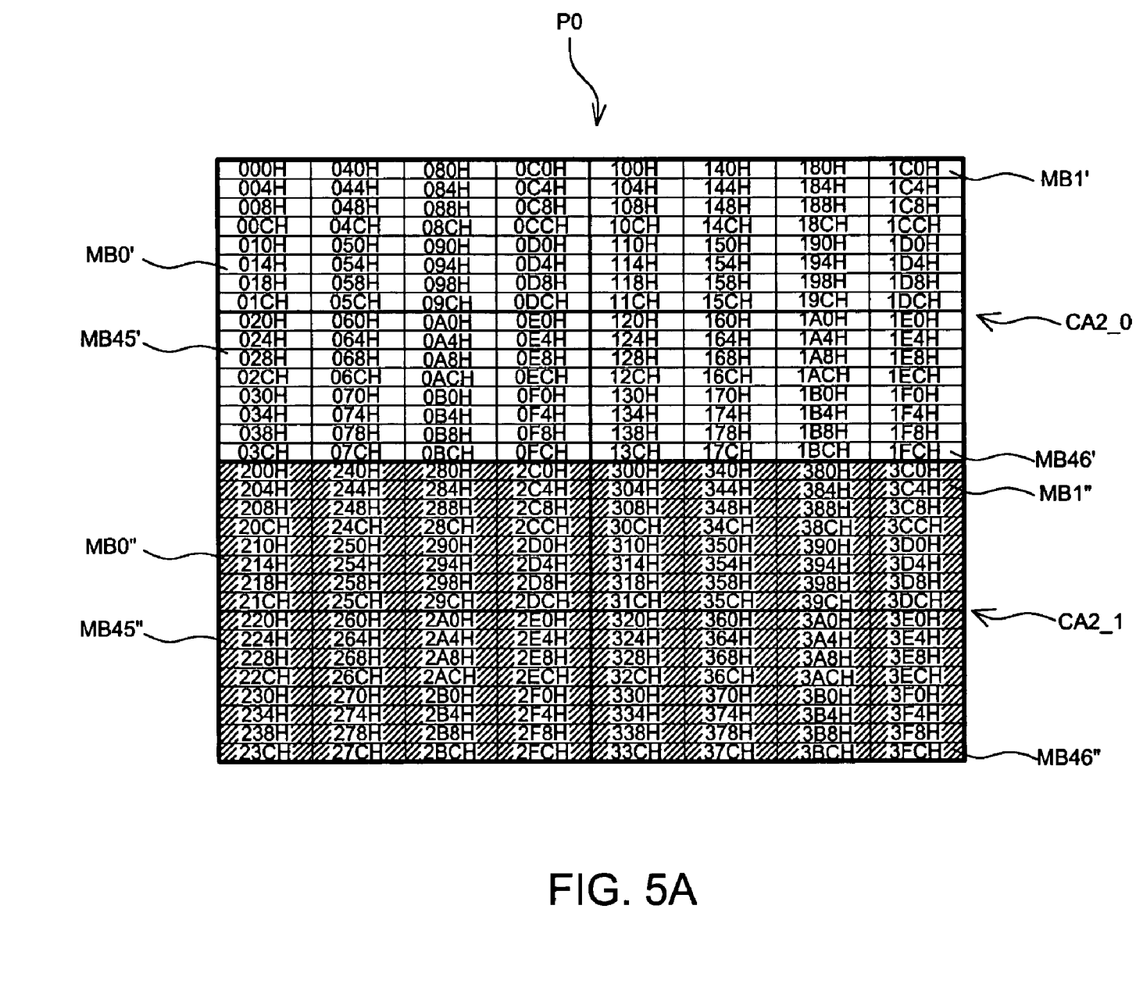
FIG. 5A is a schematic illustration showing the corresponding memory addresses when the reference picture is stored in the memory in the unit of macroblocks according to the first embodiment of the invention.
Figure 5B:
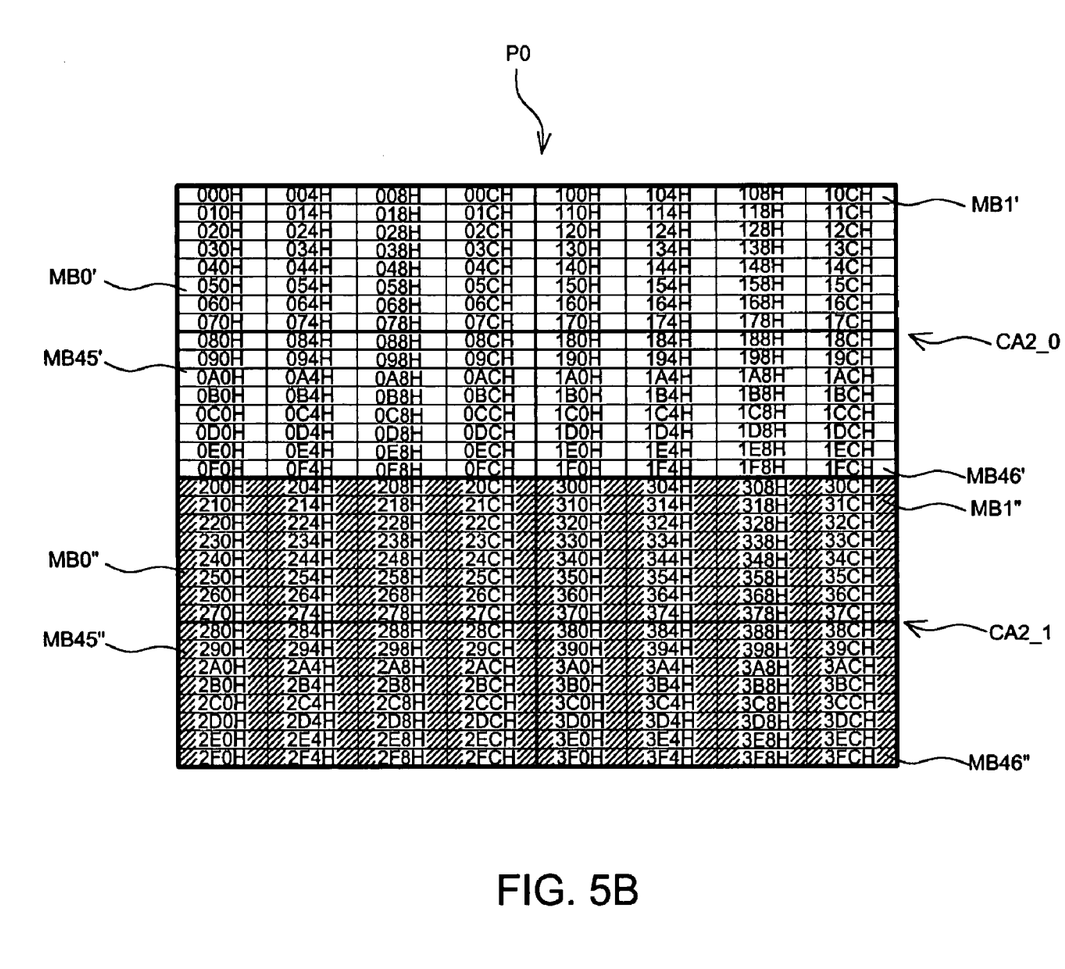
FIG. 5B is a schematic illustration showing the corresponding memory addresses when the reference picture is stored in the memory in the unit of macroblocks according to the first embodiment of the invention, wherein the addressing sequence is different from that in FIG. 5A.

FIG. 5A is a schematic illustration for further illustrating the memory addressing areas of the top and bottom sections in a page. The page is divided into a top-section TS0 and a bottom-section BS0. The top-section TS0 contains a consecutive addressing area CA2_0, and the bottom-section BS0 contains a consecutive addressing area CA2_1. In this drawing, each address is a byte address. That is, each address is directed to one byte of data. The addressing area CA2_0 contains the addresses from 000H to 1FFH, and the addressing area CA2_1 contains the addresses from 200H to 3FFH. In each of the consecutive addressing areas, the available addresses are consecutive. The corresponding top field of the four macroblocks for each page is stored in the consecutive addressing area CA2_0 of the top-section TS0, and the corresponding bottom field of the four macroblocks is stored in the consecutive addressing area CA2_1 of the bottom-section BS0 (indicated as shadowed areas in FIG. 5A). Assuming the data bus width in the system is 32 bits (double word) and each storage unit shown in the drawing is also set to be double words (4 bytes), then the page P0 stores the data of the corresponding top field of the macroblock MB0 into the addresses of 000H~01FH, 040H~05FH, 080H~09FH and 0C0H~0DFH, and stores the data of the corresponding bottom field of the macroblock MB0 into the addresses of 200H~21FH, 240H~25FH, 280H~29FH, and 2C0H~2DFH. The addressing areas of the corresponding top and bottom field of MB 1, MB 45, and MB 46 is also illustrated in FIG. 5A, accordingly. However, the addressing areas for storing the data of the corresponding top and bottom fields of the four macroblocks into a page is not limited to the above addressing sequence. Another addressing sequence, such as the one shown in FIG. 5B, is also feasible. Other addressing sequences which store the corresponding top field or bottom field of the macroblocks belonging to a page into the top-section or the bottom-section may also be adopted here. For example, as shown in FIG. 5B, the page P0 can also store the data MB0', MB45', MB1' and MB46' of the corresponding top field of the macroblocks MB0, MB45, MB1 and MB46 into the area of 000H~07FH, 080H~0FFH, 100H~17FH, and 180H~1FFH, respectively, and store the data MB0", MB45", MB1" and MB46" of the corresponding bottom field of the macroblocks MB0, MB45, MB1 and MB46 into the area of 200H~27FH, 280H~2FFH, 300H~37FH, and 380H~3FFH, respectively.

After the method of storing the pixel data of a reference picture into a memory is described, we now illustrate the method of retrieving the prediction blocks of the reference picture in this embodiment. The dashed rectangles shown in FIG. 3 indicate the positions of several prediction blocks. In an example, there are two prediction blocks PB1 and PB2 in FIG. 3 and FIG. 4. The prediction block PB1 has a size of 16*33 bytes, and the prediction block PB2 has a size of 16*16 bytes. The procedure of reading pixel data of the prediction blocks PB1 and PB2 according to this embodiment will be described herein.

Firstly, we illustrate the field access method in this embodiment by reading only the top field of the prediction block PB1. The to-be-read areas include sub-areas SB1 and SB2, as shown in FIG. 4. Thus, the pages that are to be read when retrieving the pixel data of the prediction block PB1 include pages P0, P1, and P24. As shown in the drawing, the sub-area SB1 is distributed over the pages P0 and P1, while the sub-area SB2 is distributed over the page P24. The data belonging to different pages are sequentially read in a page-by-page manner in this embodiment so as to reduce the number of cross-pages. That is, the data of the sub-area SB1 within the page P0 is read first. Then, the data of the sub-area SB1 within the page P1 is read. Finally, the data of the sub-area SB2 within the page P24 is read. It should be noted that the sequence of reading these different pages may also be varied according to the spirit of the present invention.

Compared with the conventional frame-organized method, since the top fields of the macroblocks are consecutively addressed in this embodiment, we can easily use DRAM burst access mode to burst access these top field by DRAM burst access. Therefore, the effective DRAM bandwidth can be greatly increased. The above description illustrates accessing the top field of the prediction block using the DRAM burst access mode according to one embodiment. Similarly, the DRAM burst access mode can also be used to burst access the bottom field of the prediction block. Details will not be described for brevity.

Secondly, we illustrate the frame access method in this embodiment by reading both the top field and the bottom field of the prediction block PB2. The to-be-read areas include the sub-areas SB3 to SB6, as shown in FIG. 4. Thus, the pages that are to be read in this example include pages P3, P26 and P27. The sub-areas SB3 and SB4 are distributed over the page P3, while the sub-areas SB5 and SB6 are distributed over the pages P26 and P27. The data belonging to different pages are sequentially read in a page-by-page manner so as to reduce the number of cross-pages. That is, the data of the sub-areas SB3 and SB4 within the page P3 are read first in this embodiment. Then, the data of the sub-areas SB5 and SB6 within the page P26 are read. Finally, the data of the sub-areas SB5 and SB6 within the page P27 are read.

Compared with the conventional field-organized storage method, since the top field and bottom field of each macroblock are stored in the same page in this embodiment, the number of cross-pages can be substantially reduced since there will be no cross-page penalties when it is required to read both the top and bottom field of the same macroblock. Furthermore, since the top field or bottom fields of a macroblock are consecutive addressed in this embodiment, we can easily use DRAM burst access mode to burst access these top field or bottom field by DRAM burst access. Therefore, the effective DRAM bandwidth can be increased.

Figure 6A:
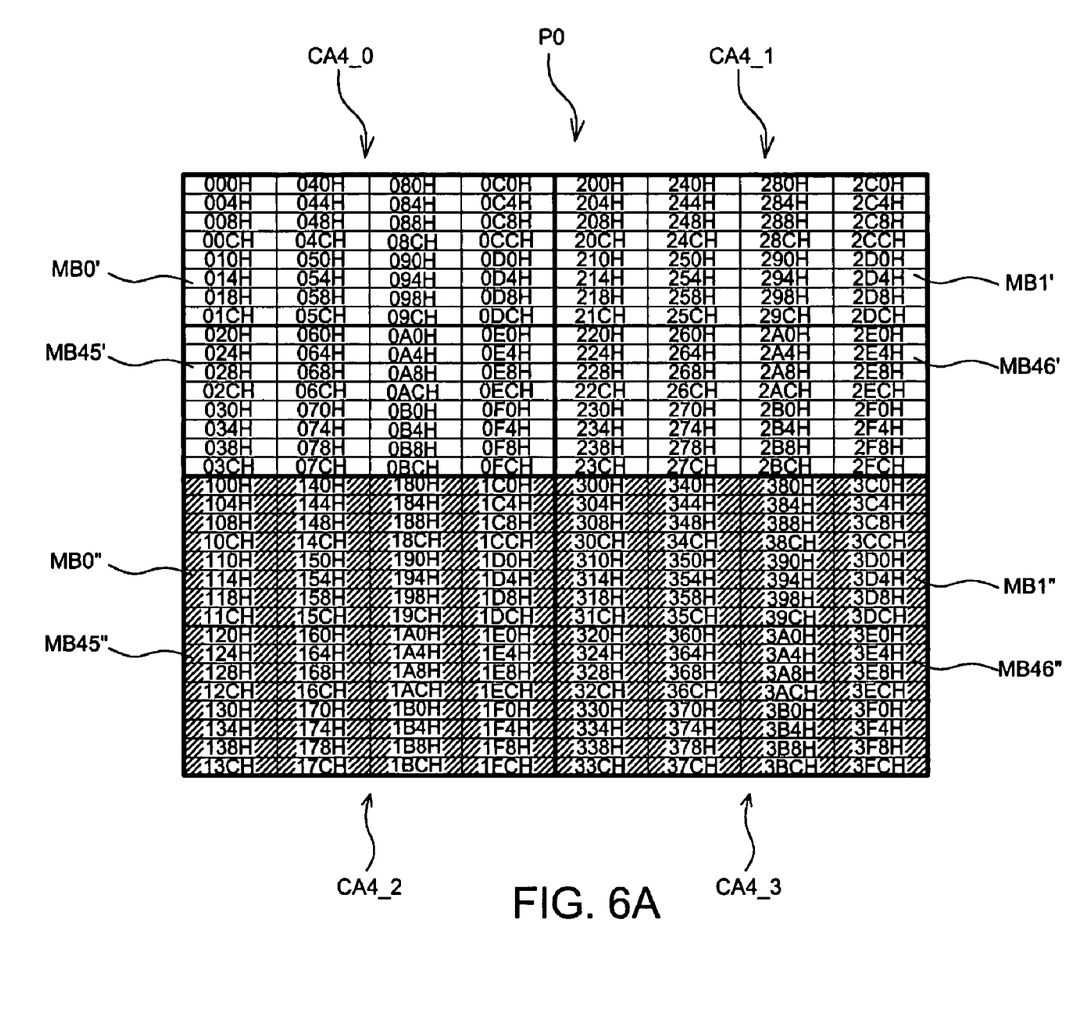
FIG. 6A is another schematic illustration showing the memory addressing areas of the top and bottom field data in a page according to the second embodiment of the invention.
Figure 6B:
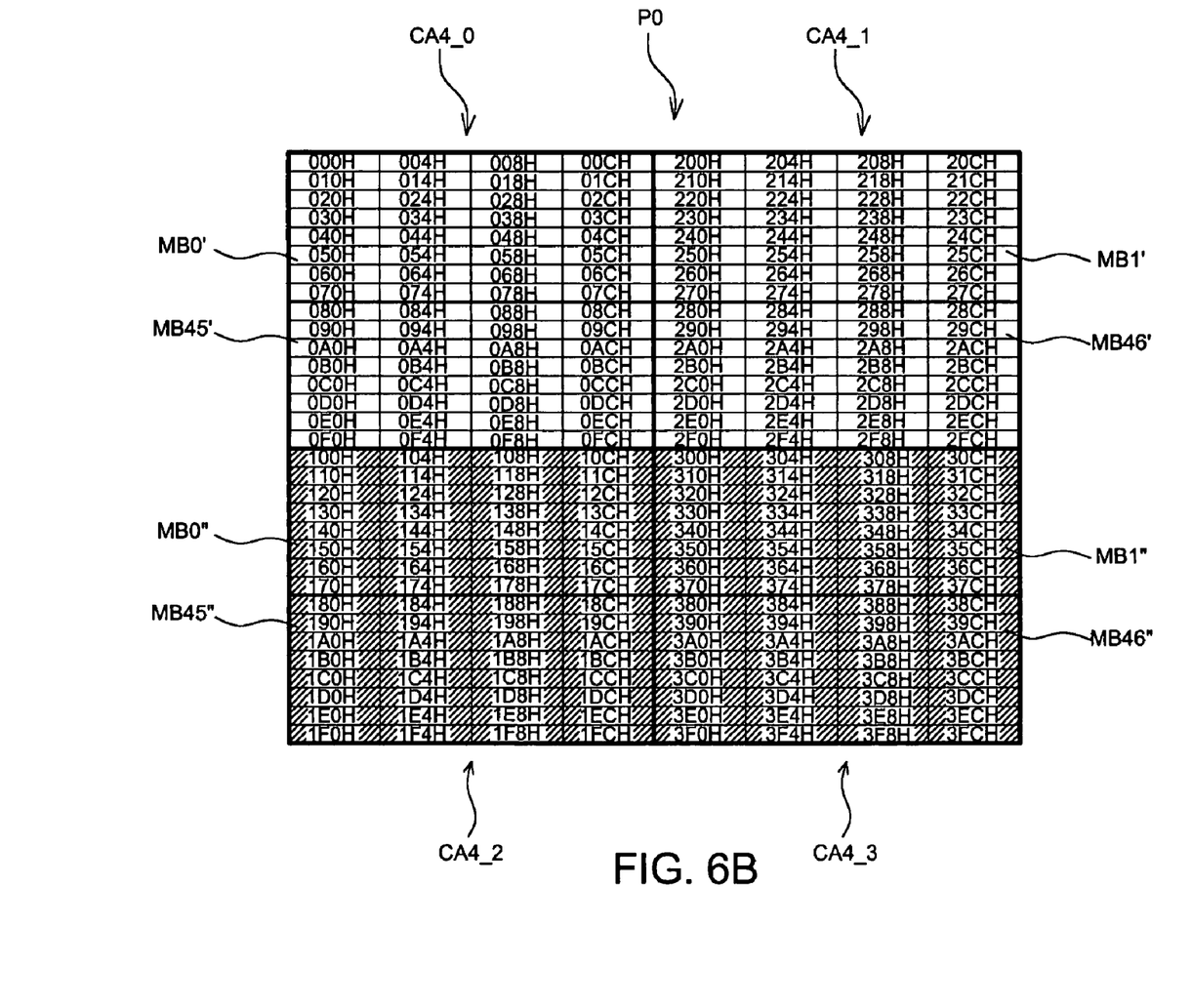
FIG. 6B is another schematic illustration showing the memory addressing areas of the top and bottom field data in a page according to the second embodiment of the invention, wherein the addressing sequence is different from that in FIG. 6A.

FIG. 6A illustrate another embodiment of the memory addressing areas of the top and bottom field in a page according to the present invention. In the first embodiment as shown in FIG. 5A, each page of the memory is divided into a top-section TS0 having one consecutive addressing area CA2_0, and a bottom-section BS0 having one consecutive addressing area CA2_1. In the second embodiment as shown in FIG. 6A, a page P0 is divided into a top-section TS0 having two consecutive addressing areas CA4_0, CA4_1, and a bottom-section BS0 having two consecutive addressing areas CA4_2, and CA4_3. The consecutive addressing area CA4_0 contains the addresses from 000H to 0FFH; the consecutive addressing area CA4_1 contains the addresses from 200H to 2FFH; the consecutive addressing area CA4_2 contains the addresses from 100H to 1FFH; and the consecutive addressing area CA4_3 contains the addresses from 300H to 3FFH. In each of the consecutive addressing areas, the available addresses are consecutive. The data of the corresponding top field of the four macroblocks are stored into the two consecutive addressing areas CA4_0 and CA4_1 of the top-section TS0, and the data of the corresponding bottom field of the four macroblocks are stored into the two consecutive addressing areas CA4_2, and CA4_3 of the bottom-section BS0. More particularly in this embodiment, the data of the corresponding top field of MB0 and MB45 are stored into the consecutive addressing area CA4_0 of the top-section TS0, and the data of the corresponding top field of MB1 and MB46 are stored into the consecutive addressing area CA4_1 of the top-section TS0. The data of the corresponding bottom field of MB0 and MB45 are stored into one consecutive addressing area CA_4_2 of the bottom-section BS0, and the data of the corresponding bottom field of MB1 and MB46 are stored into the consecutive addressing area CA4_3 of the bottom-section BS0. However, the addressing areas for storing the data of the corresponding top and bottom fields of the four macroblocks into a page is not limited to the above addressing sequence. Another addressing sequence, such as the one shown in FIG. 6B, is also feasible.

In the above embodiments, the top-section comprises a same number of consecutive addressing areas as of the bottom-section. However, people skilled in the art will appreciate that the top-section and the bottom-section may comprise different numbers of consecutive addressing areas according to the spirit of the invention. For the sake of brevity, the further details will not be redundantly described here.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method of storing an array of digital data into a memory, the memory having a plurality of memory pages, at least one memory page which only has a row with a plurality of memory cells having a first memory section and a second memory section, the method comprising the steps of:
   dividing the array of digital data into a plurality of block units, each of the block units having a plurality of odd rows and a plurality of even rows, each of the odd rows and the even rows having at least one byte; and
   storing subsequent odd rows of at least one of the block units into consecutive storage locations in the first memory section, and storing subsequent even rows of at least one of the block units into consecutive storage locations in the second memory section;
   wherein the first memory section has a first number of first areas and the second memory section has a second number of second areas, each of the first areas and the second areas has consecutive storage locations, each of the first number and the second number is larger than one, each of the first and the second areas comprises a plurality of rows of one of the block units, and the first areas and the second areas in the first memory section and the second memory section respectively are in interlaced arrangement.

2. The method of claim 1, wherein the array of digital data comprises a picture in a video bit stream.

3. The method of claim 1, wherein the first number is equal to the second number.

4. The method of claim 1, wherein both the first number and the second number have a value of two.

5. The method of claim 1, wherein each of the block units has m rows, wherein m is an integer equal to or larger than four.

6. The method of claim 5, wherein m is equal to thirty-two.

7. A method of storing an array of digital video data representing a picture in a video bit stream into a memory, the memory having a plurality of memory pages, at least one memory page which only has a row with a plurality of memory cells having a first memory section and a second memory section, the method comprising the steps of:
   dividing the array of digital video data into a plurality of block units, each of the block units having a plurality of odd rows and a plurality of even rows, each of the odd rows and the even rows having at least one byte; and
   storing subsequent odd rows of at least one of the block units into consecutive storage locations in the first memory section, and storing subsequent even rows of at least one of the block units into consecutive storage locations in the second memory section;
   wherein the first memory section has a first number of first areas and the second memory section has a second number of second areas, each of the first areas and the second areas has consecutive storage locations, each of the first number and the second number is larger than one, each of the first and the second areas comprises a plurality of rows of one of the block units, and the first areas and the second areas in the first memory section and the second memory section respectively are in interlaced arrangement.

8. The method of claim 7, wherein each of the block units has m rows, wherein m is an integer equal to or larger than four.

9. A method for storing an array of digital data representing a picture into a memory and retrieving a prediction block of the picture from the memory, the memory having a plurality of memory pages, at least one memory page which only has a row with a plurality of memory cells having a first memory section and a second memory section, the method comprising the steps of:
   dividing the array of digital video data into a plurality of block units, each of the block units having a plurality of odd rows and a plurality of even rows, each of the odd rows and the even rows having at least one byte;
   storing subsequent odd rows of at least one of the block units into consecutive storage locations in the first memory section, and storing subsequent even rows of at least one of the block units into consecutive storage locations in the second memory section; and
   retrieving the digital data representing the prediction block stored in the first memory section, and retrieving the digital data representing the prediction block stored in the second memory section;
   wherein the first memory section has a first number of first areas and the second memory section has a second number of second areas, each of the first areas and the second areas has consecutive storage locations, each of the first number and the second number is larger than one, each of the first and the second areas comprises a plurality of rows of one of the block units, and the first areas and the second areas in the first memory section and the second memory section respectively are in interlaced arrangement.

10. The method of claim 9, wherein each of the block units has m rows, wherein m is an integer equal to or larger than four.

* * * * *